US010771540B2

(12) United States Patent
Maslak

(10) Patent No.: US 10,771,540 B2
(45) Date of Patent: *Sep. 8, 2020

(54) ANYCAST ROUTING TECHNIQUES IN A NETWORK

(71) Applicant: Level 3 Communications, LLC, Broomfield, CO (US)

(72) Inventor: Joelle T. Maslak, Golden, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,217

(22) Filed: Sep. 30, 2019

(65) Prior Publication Data

US 2020/0036781 A1   Jan. 30, 2020

Related U.S. Application Data

(63) Continuation of application No. 15/494,032, filed on Apr. 21, 2017, now Pat. No. 10,432,710.

(60) Provisional application No. 62/326,693, filed on Apr. 22, 2016.

(51) Int. Cl.
*H04L 29/08* (2006.01)
*H04L 29/12* (2006.01)

(52) U.S. Cl.
CPC ...... *H04L 67/1023* (2013.01); *H04L 61/1511* (2013.01); *H04L 67/1008* (2013.01); *H04L 67/1021* (2013.01); *H04L 67/327* (2013.01)

(58) Field of Classification Search
CPC ............. H04L 61/1511; H04L 61/1552; H04L 67/1008; H04L 67/1021; H04L 67/1023; H04L 67/327; H04L 67/18; H04L 67/2842
See application file for complete search history.

(56) References Cited

U.S. PATENT DOCUMENTS

| 8,707,039 | B2 | 4/2014 | Coppola et al. |
| 8,745,240 | B2 | 6/2014 | Sakata et al. |
| 9,021,112 | B2 | 4/2015 | Slocombe et al. |
| 10,178,065 | B2 | 1/2019 | Leach |
| 2010/0146038 | A1 | 6/2010 | Hajiaghayi |
| 2011/0040861 | A1 | 2/2011 | Van der Merwe et al. |

(Continued)

OTHER PUBLICATIONS

International Preliminary Report on Patentability, dated Oct. 23, 2018, Int'l Appl. No. PCT/US17/02897, Int'l Filing Date Apr. 21, 2017; 8 pgs.

(Continued)

*Primary Examiner* — Todd L Barker

(57) ABSTRACT

Aspects of the present disclosure involve systems, methods, computer program products, and the like, for managing the distribution of content and/or communications from a telecommunications or computer network to an end user of the network. In general, the system receives a request for content from a user of the network and analyzes the request to determine an estimated geographic region and/or an access network associated with the requesting device. Based on the determined geographic region or access network, a networking device returns a specific anycast IP address from which the content may be received. In this manner, the content providing network may utilize multiple anycast IP addresses within the network to provide content to one or more end users of the network. The specific anycast IP address is provided to an end user device to obtain the requested content.

20 Claims, 4 Drawing Sheets

(56) References Cited

U.S. PATENT DOCUMENTS

2014/0344400 A1 11/2014 Varney et al.
2014/0379929 A1 12/2014 Cicic
2015/0215388 A1 7/2015 Kontothanassis
2016/0119279 A1 4/2016 Maslak et al.
2016/0315857 A1 10/2016 Lubashev
2017/0310744 A1 10/2017 Maslak

OTHER PUBLICATIONS

International Search Report dated Jul. 10, 2017, Int'l Appl. No. PCT/US17/028897, Int'l Filing Date Apr. 21, 2017; 3 pgs.
Written Opinion of the International Searching Authority dated Jul. 10, 2017, Int'l Appl. No. PCT/US17/028897, Int'l Filing Date Apr. 21, 2017; 6 pgs.

ANYCAST ROUTING TECHNIQUES IN A NETWORK

CROSS-REFERENCE TO RELATED APPLICATIONS

This application is a continuation of U.S. patent application Ser. No. 15/494,032, filed on Apr. 21, 2017, titled "ANYCAST ROUTING TECHNIQUES IN A NETWORK," which application is related to and claims priority under 35 U.S.C. § 119(e) from U.S. Patent Application No. 62/326,693, filed Apr. 22, 2016, titled "ANYCAST ROUTING TECHNIQUES IN A NETWORK," the entire contents of which are incorporated herein by reference for all purposes.

TECHNICAL FIELD

Aspects of the present disclosure generally relate to network resource selection and delivery in a computer network, and more particularly to processing or otherwise manipulating routing of content or communications from a computer network.

BACKGROUND

Telecommunication or other types of computer networks provide for the transmission of information across some distance through terrestrial, wireless or satellite communication networks. Such communications may involve voice, data or multimedia information, among others. Typically, such networks include several servers or other resources from which the content or network services can be supplied to a requesting end user. To decrease latency, increase throughput, and reduce the amount of traffic being transmitted through a related network, a network will typically attempt to provide the content or communications from a network component that is separated by as little network infrastructure as possible from the requesting device. Thus, for example, a request received from an end user in Denver, Colo. for access to the network is preferably served from a server (such as one also located in Denver, Colo.) so that the path with the fewest number of network elements and shortest communication cable distance are utilized between the server and the end user.

However, many end users have access the network through several access networks and/or connection routes. Thus, there may be present several potential transmission paths between the network server providing content and the end user receiving the content. Further, because access networks may also connect to the providing network in several locations, the providing network may not always have enough information to provide the content to the end user along the shortest or "best" transmission path. As such, the route that utilizes the least number of network elements and shortest communication distance may not always be selected to provide the content to the end user device. Such circumstances may exact an unnecessary usage cost or performance impact for the network.

SUMMARY

One implementation of the present disclosure may take the form of a method for servicing requests for content in a content delivery network (CDN). The method includes the operations of receiving a request for an Internet Protocol (IP) address for a content servicing device in a CDN, obtaining an approximate network topology location of a requesting device based at least on the request for the IP address, selecting a topology-specific anycast IP address based at least on the approximate network topology location of the requesting device, the topology-specific anycast IP address selected from a plurality of anycast IP addresses utilized in the CDN, and transmitting the topology-specific anycast IP address to the requesting device. Another implementation may take the form of a CDN networking device comprising at least one communication port for communication with a network, a processing device, and a computer-readable medium connected to the processing device configured to store information and instructions that, when executed by the processing device, performs the above operations.

Another implementation of the present disclosure may take the form of a content delivery network (CDN). The CDN may include an authoritative domain name system (DNS) server receiving a request from a requesting device for an Internet Protocol (IP) address for a content servicing device, obtaining an approximate network topology location of a requesting device based at least on the request for the IP address, and transmitting a topology-specific anycast IP address to the requesting device based at least on the approximate network topology location of the requesting device, the topology-specific anycast IP address selected from a plurality of anycast IP addresses utilized in the CDN and a content delivery device broadcasting the plurality of anycast IP addresses and providing content to an end user device based on a request received from the end user device at the topology-specific anycast IP address.

DETAILED DESCRIPTION

Aspects of the present disclosure involve systems, methods, computer program products, and the like, for managing the distribution of content and/or communications from a telecommunications or computer network to an end user of the network. In general, the system receives a request for content from a user of the network and analyzes the request to determine an estimated geographic region and/or an access network associated with the requesting device. Based on the determined geographic region or access network, a networking device returns a specific anycast IP address from which the content may be received. In this manner, the content providing network may utilize multiple anycast IP addresses within the network to provide content to one or more end users of the network. The specific anycast IP address is provided to an end user device to obtain the requested content.

In addition, each of the content providing devices in a content providing network may broadcast each of the group of anycast IP addresses utilized by the content providing network. Thus, an end user device may be connected to a content providing device that is located near the end user device by using the specific anycast IP provided by the network. However, through the use of multiple anycast IP addresses, several advantages are gained. For example, an end user device that utilizes a requesting device that is located in a separate region from the end user device to request the content may, nonetheless, receive the content from a local content server as the end user is routed to a local content server based on the specific anycast IP address. Further, the content providing network may detect erroneous estimations of geographic locations of requesting devices through an analysis of the connection of end users to the network. In yet another example, the content providing network may perform load balancing across several content providing devices through the return of both specific anycast IP addresses and unicast IP addresses to requesting devices, depending on a detected load condition at one or more content providing devices.

Figure 1:
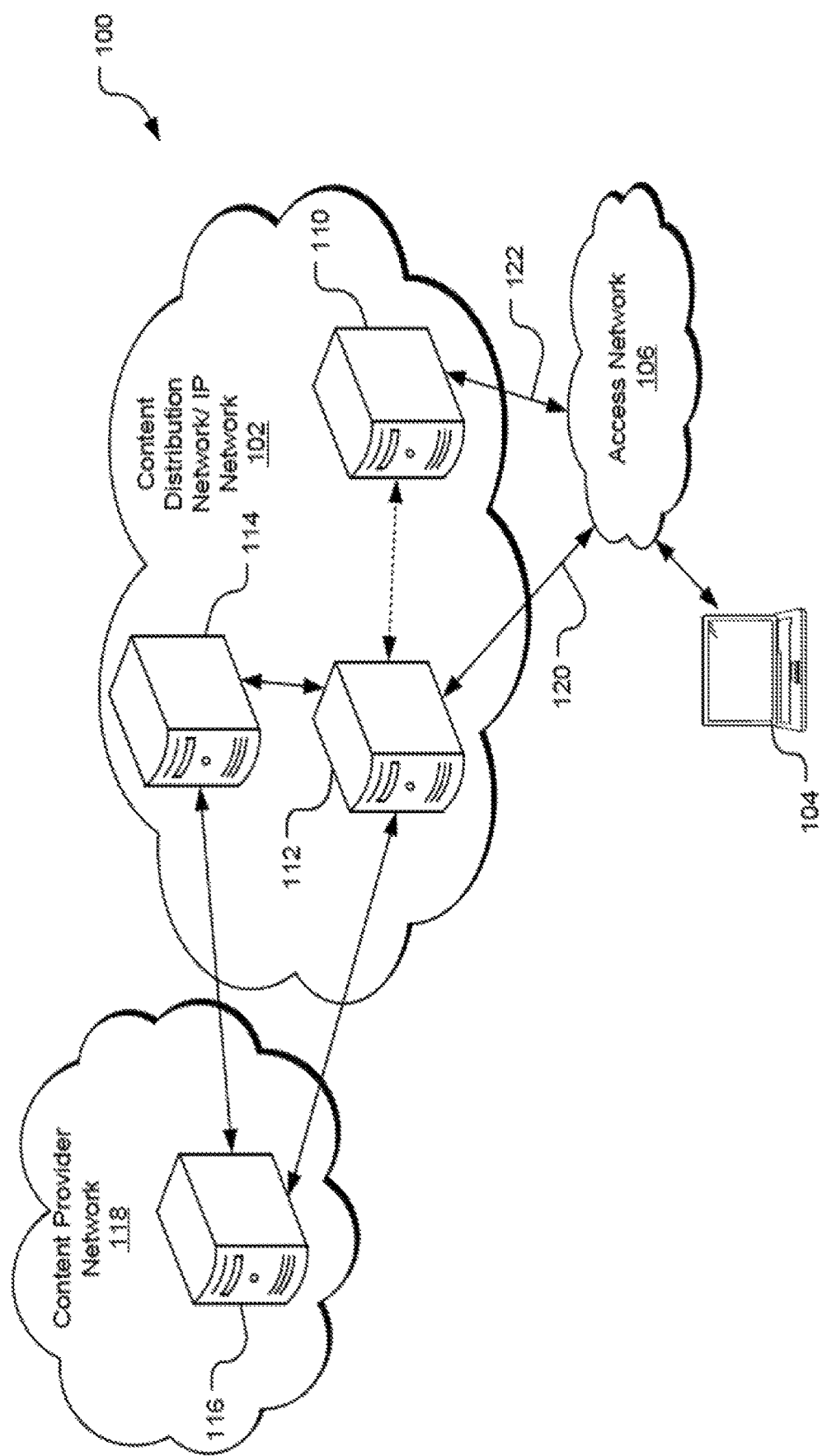
FIG. 1 is an example network environment for distributing content to an end user from a network, such as a content delivery network (CDN).

FIG. 1 is a network environment 100 for distributing content to one or more users. In general, the network environment 100 receives a request for content from a user of the network and determines a server or content providing component within the network to provide the content to the user. Although illustrated in FIG. 1 as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks. In yet another embodiment, the user device 104 may be a component of access network 106.

The CDN 102 is capable of providing content to a user device 104, which is generally any form of computing device, such as a personal computer, mobile device, tablet (e.g., iPad™) set-top box, or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 or several such servers or devices in the CDN 102.

The directory server 110 responds to the request from the end user device 104 or access network 106 by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. The operation of the directory server 110 and access network 106 to resolve requests for content from the user device 104 is discussed in more detail below with reference to FIG. 2.

In one implementation, the CDN 102 includes an edge server 112, which may cache content from another server to make it available in a more geographically or logically proximate location to devices, including user device 104, accessing the network throughout a large geographic area. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In addition, the CDN may broadcast to the access networks 106, 108 connected to the CDN information concerning the content serving nodes available in the CDN. In particular, the CDN may broadcast Border Gateway Protocol (BGP) information about the access path to content serving CDN components. In general, BGP information (or BGP session, BGP feed or BGP data) is a table of Internet Protocol (IP) prefixes which designate network connectivity between autonomous systems (AS) or within AS networks. BGP information for a network route may include path, network policies and/or rule-sets for transmission along the path, among other information. The BGP feed may also include Interior Gateway Protocol (IGP) information for network routes within an AS or network and/or other network information that pertains to the transmission of content from the CDN.

As mentioned, the BGP information may include a path that designates the networks through which stored content may be accessed. In particular, a CDN may broadcast a network autonomous system (AS) identifier as part of the BGP announcement. The network identifier identifies the particular network that the content is stored on and available to an end user device. Additional network autonomous system identifiers between the end user device 104 and the stored content may be appended to or added to the BGP path information for the content. Thus, in one embodiment, the BGP path information may provide a series of identifiers for networks through which the content may be accessed by the end user device 104. This information may be manipulated by the CDN or other network to potentially reduce the transmission time of the content through one or more of the connected networks.

In one implementation, a user of the user computing device 104 enters a link name (e.g., URL or other identifier) into a browser executed on the computing device. The link name is associated with a network address within the CDN 102 at which the content may be obtained and provided to the computing device. For example, the user of the user device 104 may enter a URL such as http://www.example.com/content into the browser of the computing device. Upon entering the URL, the hostname may be extracted by the browser (www.example.com in this particular case) and sends a request (possibly via an operating system running within the computing device 104) to a domain name server (DNS) associated with the user's access network 106. Thus, the computing device 104 transmits the request for a content-serving device to the DNS that includes the hostname of the requested content.

While the DNS is often implemented to cache responses, the DNS often does not have a cached IP address for the requested content within the CDN 102. In such cases, the DNS transmits a second DNS request to a DNS server (such as directory server 110) of the CDN 102 to determine an IP address in the CDN 102 at which the content file may be obtained. In one embodiment, the DNS server 110 of the CDN 102 may be referred to as an Authoritative Resolver. Similar to the DNS request above, the DNS request to the Authoritative Resolver 110 may include the hostname of the requested content, as well as an IP address associated with the computing device and/or an IP address associated with the requesting DNS of the access network 106.

Figure 2:
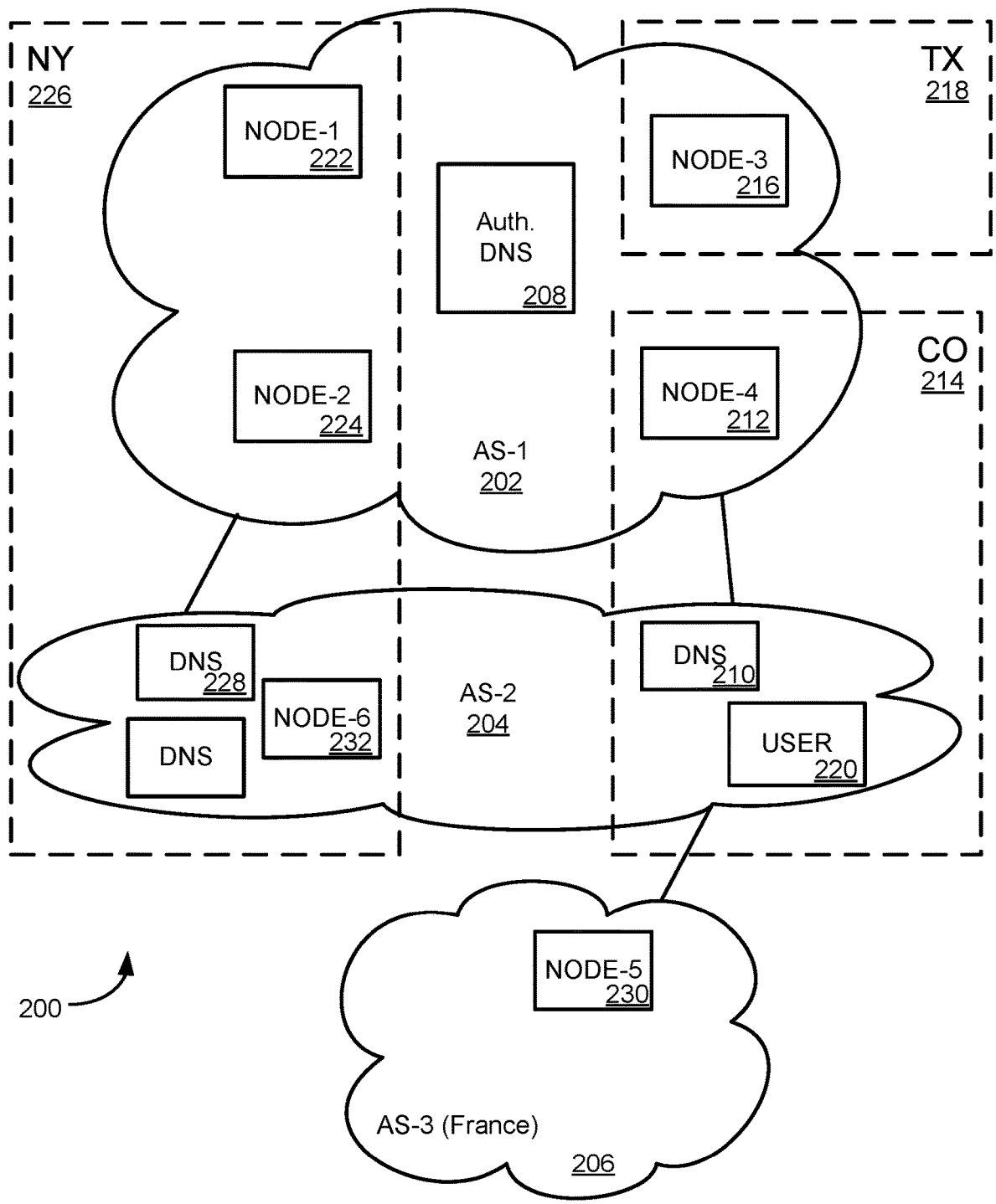
FIG. 2 is an example network environment for distributing content to one or more end users of the network, including access to the content through multiple anycast IP address.

FIG. 2 is an example network environment 200 for distributing content to a plurality of users of a CDN that utilizes geographically close content servers and one or more anycast addresses. In general, network AS-1 202 of the environment 200 may be a CDN similar to that described above with relation to FIG. 1. Thus, AS-1 202 may include an Authoritative DNS server 208 for resolving requests for content from the CDN as described. In other words, the Authoritative DNS 208 may receive DNS requests from one or more domain name servers in communication with AS-1 202, such as a DNS of an access network connected to or in communication with AS-1 202. In response to the request, the Authoritative DNS 208 returns an IP address of a CDN node or content server within AS-1 202 from which the user device 220 may receive the content. Thus, as explained above, a user (such as "user" 220 of AS-2 204) transmits a request to a DNS (such as "DNS" 210 of AS-2) to access content from a server or networking device of AS-1 202. The DNS 210 transmits the request from the user device 220 to the Authoritative DNS 208 to determine which CDN node(s) within AS-1 202 the content may be received. The Authoritative DNS 208 returns an IP address or other identifier of a content server or CDN node (such as Node-4 212) of AS-1 202 from which the content is available to be received. In many instances, the Authoritative DNS 208 attempts to return an IP address for a node or device that is geographically close to the requesting device or network to minimize the number of components through which the content is served to the end user device.

In many instances, the Authoritative DNS 208 may return multiple anycast or unicast addresses in response to a single request from the user device 220. This may be done to spread the load of requests across multiple content servers of the CDN. A client receiving the multiple anycast or unicast addresses may select one at random or through a selection procedure to ensure that no one content providing component of the CDN receives too many requests for content at once. However, for ease of understanding, the present disclosure discusses the Authoritative DNS 208 providing a particular anycast or unicast address in response to the request from the user device 220. Further, although it is discussed throughout this disclosure as returning an IP address for a node or device that is geographically close to the requesting device, it should be appreciated that such proximity may be based on network topology and not necessarily just geographic distance. For example, the CDN may be configured such that accessing a node in the same geographic location may require the communication packets to be transmitted far from the requesting device to exit the CDN before being transmitted back to the requesting device. Thus, although discussed in relation to a close geographic consideration, the decision on which IP address and type to return to a requesting device 220 based on a request may also consider other factors, such as network topology and/or one or more business rules for packet transmission in relation to the CDN.

To return an address for content servers that are geographical close to a requesting DNS 210, the Authoritative DNS 208 may associate an IP address of a requesting DNS 210 with a known or approximate geographic location. For example, the request for content received from DNS 210 of AS-2 204 located in Colorado may include the DNS IP address. The Authoritative DNS 208, in turn, accesses a database of estimated geographic locations of devices associated with known IP addresses and associates the requesting DNS 210 IP address with the location stored in the database. In the current example, the Authoritative DNS 208 may receive from the database a Colorado location associated with the requesting DNS 210 IP address. With this information, Authoritative DNS 208 may select a content delivery device or network geographically near the requesting DNS 210 to provide the content to the end user 220. For example, the Authoritative DNS 208 may return an IP address for Node-4 212 of AS-1 202 in response to the received request as Node-4 is located near Colorado (as shown by box 214 which indicates that the components within the box are located within Colorado). In this manner, the user 220 in Colorado may be connected to Node-4 212 also in Colorado to reduce the distance between the content server and the user. Users requesting content in Texas may receive an IP address for Node-3 216 (located within the box 218 for Texas), while users in New York may receive in IP address for Node-1 222 or Node-2 224 (as shown in box 226 for New York). It should be appreciated that the operations to locate a content providing device or network geographically near the requesting device is but one way in which a telecommunications network or CDN may choose the content providing device.

In one implementation, the IP address for a Node 212 of AS-1 202 returned by Authoritative DNS 208 may be a unique IP address for that particular CDN node, also sometimes referred to as a unicast address. In another implementation, the Authoritative DNS 208 may return a global IP address (sometimes known as an anycast address) that allows the user to connect to one or more Nodes of the network. For example, each Node in the network 202 may announce one or more IP addresses associated with the Node. In some instances, the announced IP address is a unique IP address associated only with the Node. In other instances, multiple Nodes in AS-1 202 may announce a common IP address through which the Nodes may be accessed. This anycast IP address allows for a user device 220 to connect to each of the Nodes that announced the anycast address within the network 202. Upon receiving the anycast address, the user device connects to AS-1 202 and a router or other routing system of the network determines which Node of AS-1 is associated with the anycast address is nearest the router. In this case, a request for content received at the router of AS-1 202 from the user device 220 of AS-2 204 would be routed to Node-4 212 to receive the content as Node-4 has announced the anycast address as a destination for Node-4 and Node-4 is nearest to the requesting device.

For anycast implementations, the Authoritative DNS 208 would return the anycast address for requests for content from a DNS (such as DNS 210 of AS-2 204). For example, requests for content from the CO DNS 210 and a NY DNS 228 of AS-2 204 would receive the same anycast address as resolved by the Authoritative DNS 208. Because both Node-4 212 and Node-2 224 of AS-1 202 announces the same anycast address (such that either Node may be accessed through the same IP address) and routing within AS-1 occurs along the shortest path, a New York DNS 228 would be connected to Node-2 224 and a Colorado DNS 210 would be connected to Node-4 212 in Colorado. The local connection of the requesting DNS to a Node occurs through one or more routers of the networks being configured to terminate communications at the nearest device reachable through the IP address of the communication. Thus, because both Nodes may be accessed through the same anycast address, routers of the networks would connect a requesting DNS to the geographically nearest device announcing that address. This is a similar result as obtained above with respect to the Authoritative DNS 208 returning a unicast address for requests for content providers.

One advantage to utilizing an anycast address is that even DNS requests received at the Authoritative DNS 208 geographically far from the user device 220 may still cause the content to be served to the user near the user's location. For example, the user 220 located in Colorado in AS-2 204 may request content utilizing the DNS 228 located in New York (due to the network structure of AS-2, among other potential factors). The Authoritative DNS 208 would return the anycast address to the NY DNS 228, which would then direct the user 220 to AS-1 202 by the returned anycast address. However, because Node-4 212 located in Colorado also broadcasts the anycast address, the user 220 would still be connected to Node-4 as that device is located nearest the user. More particularly, one or more routers of the networks would determine that Node-4 212 is nearer the requesting device 220 than Node-2 224 when both Nodes are announcing the same address (the anycast address). Thus, the routers would route the connection based on shortest path to Node-4 212.

In some instances, however, providing an anycast address for content requests may become problematic for the network AS-1 202 as business rules often determine routing between AS networks rather than shortest path. For example, many AS networks are peers that include free or reduced rates for transmitting communications between the networks. Other AS networks charge fees for ingress or egress communications. Thus, many AS networks configure their communication devices and routing structures to favor peer networks to reduce operational costs. In another example, many AS networks are configured to transmit communications off the AS network as quickly as possible to reduce transmission load on the network. This situation may occur when connecting a user to a Node for content requires transmitting the request through another AS to reach the destination AS with the content server. For example and utilizing the network example of FIG. 2, it may occur that the closest connection to another AS for users 220 in Colorado 214 is through AS-3 206 that is maintained out of France. Thus, although both AS-1 202 and AS-3 206 may both provide the requested content to the user 220 with the Node 212 of AS-1 being geographically closer to the end user, the user may nonetheless be routed to AS-3 in France to receive the content (from Node-5 230) due to a closer connection between the AS networks and the business rule to offload the request to another AS network as quickly as possible.

Also, in some instances, the AS network may be configured to adjust routing of content requests based on the load at one or more CDNs of the network. For example, if AS-1 202 determines that Node-4 212 is under a high load condition, the Authoritative DNS 208 may be configured to re-route content requests to Node-3 216 in Texas, although Node-3 may be further away from the requesting devices (such as user 220) as Node-4. This is done so that Node-4 does not become overloaded and negatively impact the performance of providing the content. For networks that utilize a unicast address, the switching of content serving to another Node is simple. In general, once the overloading situation is detected, the Authoritative DNS 208 simply begins returning a unicast address for the overflow Node (in this example, Node-3 216) for at least some requesters that would otherwise be routed to Node-4. However, in an anycast implementation, providing the overflow may not be an ideal solution to a detected high load condition. Because at least some of the Nodes providing content of AS-1 202 broadcast the same anycast address, requests for content may not be redirected to another Node when a Node is overloaded. For example, assume that Node-4 212 of AS-1 202 is in a high load state but is serving requests for content based on an anycast address. Node-1 222, Node-2 224, and Node-3 216 may also be broadcasting the anycast address. Attempts to reroute new requests for content from users 220 in Colorado to another Node of AS-1 202, however, may not occur because Colorado user devices will still connect to Node-4 212 to receive the content as the closest Node broadcasting the anycast address. To stop the flow of requests to Node-4 212, Authoritative DNS 208 may remove the anycast address from the possible responses to requests for content, but this would then be propagated to the other Nodes in AS-1 202 such that these Nodes may also not provide the content for that anycast address. Further, current content providing sessions with Node-4 212 may be interrupted as the anycast address is removed from the routing table for Node-4.

To address these and other issues with anycast routing in a Node, an alternative technique for utilizing anycast routing in a Node is introduced. In this implementation, multiple anycast addresses may be utilized by the network. Each of the anycast addresses may be associated with a geographic location, network configuration, or other consideration of the network to create multiple anycast cloud networks within the larger AS network providing content. For example, AS-1 202 may associate a first anycast IP address (IP-1) for Colorado based components (such as Node-4 212 in box 214), a second anycast IP address (IP-2) for Texas based components (such as Node-3 216 in box 218), a third anycast IP address (IP-3) for New York based components (such as Node-1 222 and Node-2 224 in box 226), and so on. In other implementations, the anycast IP addresses may be associated with networks within or connected to the CDN (such as an anycast address for AS-2 204) and/or sub-networks comprising portions of the network. In general, an anycast address may be associated with any configuration, portion, or aspect of the CDN for use by the CDN in providing content to a user.

Similar to above, the Nodes of AS-1 202 may be configured to announce the anycast addresses utilized by the network. Continuing the above example, Node-1 222 through Node-4 212 may announce anycast IP addresses IP-1 through IP-3 for the different geographical or virtual portions of AS-1 202. Further, the Authoritative DNS 208 of AS-1 202 may return the anycast address associated with the estimated geographic location of the requesting DNS or device. For example, a request for content received from the Colorado Node 210 may be recognized by the Authoritative DNS 208 as coming from Colorado. The Authoritative DNS 208 may then return the anycast address associated with the Colorado portion 214 of AS-1 202, in this example, IP-1. Communications from the user device 220 may then be routed to Node-4 212 (as Node-4 announces the IP address IP-1, along with IP-2 and IP-3) through a router in AS-1 202 as being the shortest path to serve the content to the user device. In a similar manner, the Authoritative DNS 208 may return an IP-2 anycast address for DNS requests from Texas 218 and may return an IP-3 anycast address for requests from New York 226. Because each Node in AS-1 202 broadcasts each of the anycast IP addresses, the content may be provided to requesting devices from a local content server similar to that described above. Thus, the user device 220 in Colorado 214 may receive the content from Node-4 212 based on the IP-1 anycast address, while a user accessing AS-1 202 in a New York 226 connection may receive the content from Node-2 224 based on the IP-3 anycast address. Further, if the user 220 in Colorado requests the content through a New York-based DNS (such as DNS 228), the Authoritative DNS 208 may return an IP-3 anycast address (since the DNS IP address indicates the DNS is New York-based). However, the user may still receive the content from Node-4 212 (the local Colorado content server) because Node-4 also broadcasts the IP-3 anycast address. In other words, the user device 220 receives an IP-3 anycast address from the Authorization DNS 208 because of the requests ingress point (NY). However, because Node-4 212 broadcasts each of the anycast addresses for the network 202 and routers within the networks are configured to connect anycast addresses based on shortest route, the user 220 receives content from Node-4 based on the IP-3 anycast address received from the Authoritative DNS 208 and broadcast from Node-4.

Utilizing multiple anycast IP addresses within the network 202 may aid the network in overcoming some noted performance issues. For example, a Node of AS-1 202 that is providing content to a user device 220 may determine assumptions made about that device based on the anycast IP address used to retrieve the content. Continuing the above example, the user 220 in Colorado 214 may utilize an IP-3 anycast address to request content from Node-4 212 (in the situation where the DNS 228 used by the user device is located in New York 226). However, because AS-1 202 associates IP-3 anycast address with New York 226 but is serving content to a user device from Node-4 212 in Colorado 214, AS-1 may determine that the DNS IP address received to request a content IP address may be erroneously associated with a specific geographic location. In other words, the use of the location specific anycast address may highlight to the network errors in the assumed geographic location of DNS devices 228 connected to the network 202. This information may be used by AS-1 202 to correct such error in geographic locations to improve content service of the network.

Also, as mentioned above, the network (AS-1 202) may associate an anycast address (such as IP-4) with a particular customer network (AS-2 204) connected with the network. This AS specific anycast address may be used to force a customer network 204 to serve the content to a requesting user. For example, AS-2 204 may have one or more content servers or Nodes (such as Node-6 232) to provide content to users of the network. The Authoritative DNS 208 of AS-1 202 may direct requests from users of AS-2 204 to such AS-2 specific content servers 232 rather than serving the content from a Node of AS-1. To accomplish this, the Authoritative DNS 208 may recognize a DNS request from AS-2 network 204 (based on information obtained from the request, such as a requesting network identifier). The Authoritative DNS 208 may return an anycast address (such as IP-4) that the AS-1 network 202 associates with AS-2 204. Further, the Nodes 232 of AS-2 204 may also broadcast the IP-4 anycast address as a content server that can service requests for IP-4 addresses. Also, the Nodes 232 of AS-1 202 may be configured to not broadcast the IP-4 anycast address. Thus, when the user device 220 receives the IP-4 anycast address, the user device may be connected to a Node located within AS-2 204 to receive the content. In particular, networking components (such as routers and switches) with AS-2 204 routes the user device 220 to the nearest Node 232 within AS-2 such that the content is provided geographically near the user device. In this manner, the Authoritative DNS 208 may utilize the AS-2 204 specific anycast address (IP-4) to force the users of AS-2 to obtain the content from a Node 232 located within the AS-2 network. This may be performed for business purposes. For example, the operator of AS-2 204 may prefer to have the content provided from AS-2 sources. In addition, the use of the AS specific anycast address may prevent requests for content from being shared across multiple AS networks. This implementation uses the advantages of the anycast address scheme while preventing some of the issues that arise through a multi-AS network routing of content and requests.

Another advantage obtained through the use of multiple Anycast IP addresses within a network 202 is realized during load monitoring of one or more of the content servers of the network. As mentioned, the network 202 may reroute requests for content away from a content server that is experience high traffic or load. To facilitate this rerouting, the Authoritative DNS 208 may be configured to return addresses for Nodes different than the high load Node. For example, Node-4 212 may indicate to a network monitoring system that it is experiencing high load in its respective area or location. In response, the Authoritative DNS 208 may be configured to begin providing a unicast address for Node-3 216 for some requests received from Colorado-based DNS devices 210. Although Node-3 is not the geographically closest Node of AS-1 202 for Colorado DNS 210, rerouting requests to Node-3 216 may help to prevent Node-4 212 from becoming overloaded as some traffic from Colorado is now being routed to Node-3. In other words, the network 202 may determine that a slightly longer connection between the user device 220 and the providing Node 216 is preferable when the closest Node is overloaded.

Further, the particular anycast IP address utilized to request the content may indicate a location from which the high load is originating. For example, DNS requests for content from DNS devices 210 in Colorado receive an IP-1 anycast address from the Authoritative DNS 208. This address is then utilized by the user device 220 to request content from Node-4 212 (based on Node-4 broadcasting all of the anycast IP addresses used by the system). Node-4 212 may also serve content to other locations with other anycast addresses, such as requests from Texas 218 with an IP-2 anycast address. By analyzing the volume of requests received at Node-4 212 based on IP-1 addresses and IP-2 addresses, AS-1 202 may determine from which region the highest volume of requests is originating. This may aid AS-1 202 in responding to the high load volume from a particular region so as to lessen the impact upon the network. For example, AS-1 202 may bring another content server online in the region from which the highest number of requests is originating to service the high volume of requests.

Further, AS-1 202 may utilize the anycast address to determine which other Node to send request for content. For example, if many requests for content are received with the IP-1 address, AS-1 202 may assume that there is a high load condition in Colorado 214. AS-1 202 may then select the next closest Node, such as Node-3 216 in Texas 218 over Node-1 222 or Node-2 224 in New York 226. To reroute to Node-3 216, the Authoritative DNS 208 may return a unicast address for Node-3 216 for some or all requests for content originating from a Colorado-based DNS 210.

Similar to above, the network may also use the load information to detect potential performance issues with the network. For example, AS-1 202 may detect a high load condition for IP-2 addresses at Node-4 212. However, because Node-4 212 is located in Colorado 214, it may be assumed that a higher volume of IP-1 addresses would be received. In this situation, AS-1 202 may determine that IP-2 addresses (normally associated with Texas 218 based DNS requests) are being provided by the Authoritative DNS 208 to Colorado devices 220. In response, the network 202 may adjust an estimated geographic location for a DNS or user network to Colorado instead of Texas. This adjustment may occur automatically or manually by alerting the estimated location in a database or table maintained by the network.

In another example, the Authoritative DNS 208 may return an anycast address even during a high load condition determined at a Node of the network. For example, if a high load condition is detected at Node-4 212, the Authoritative DNS 208 may begin returning an IP-4 anycast address for Nodes in AS-2 204 to serve the content. This would begin to move traffic from Node-4 212 of the AS-1 202 to a Node of AS-2 204. In another example, each Node of AS-1 202 may not broadcast or announce each anycast address utilized by the network. Thus, the Authoritative DNS 208 may return an anycast address that is not broadcast by the Node under high load to reroute requests to a different Node.

In general, the IP address returned by the Authoritative DNS 208 may include a hybrid unicast/anycast scheme of configurations and instructions. In addition, the rerouting of requests to Nodes in response to a high load condition detected at a Node may utilize several mechanisms. For example, the Authoritative DNS may utilize a DNS "good enough" command. In another example, the network may utilize an HTTP redirect command to redirect requests to another Node in the network. Yet another mechanism includes IP routing schemes that allows the Node device to control which routes are accepted at the device through BGP announcements within the network. Thus, the loaded device may remove some anycast addresses from the announced addresses that may be terminated at the device.

Figure 3:
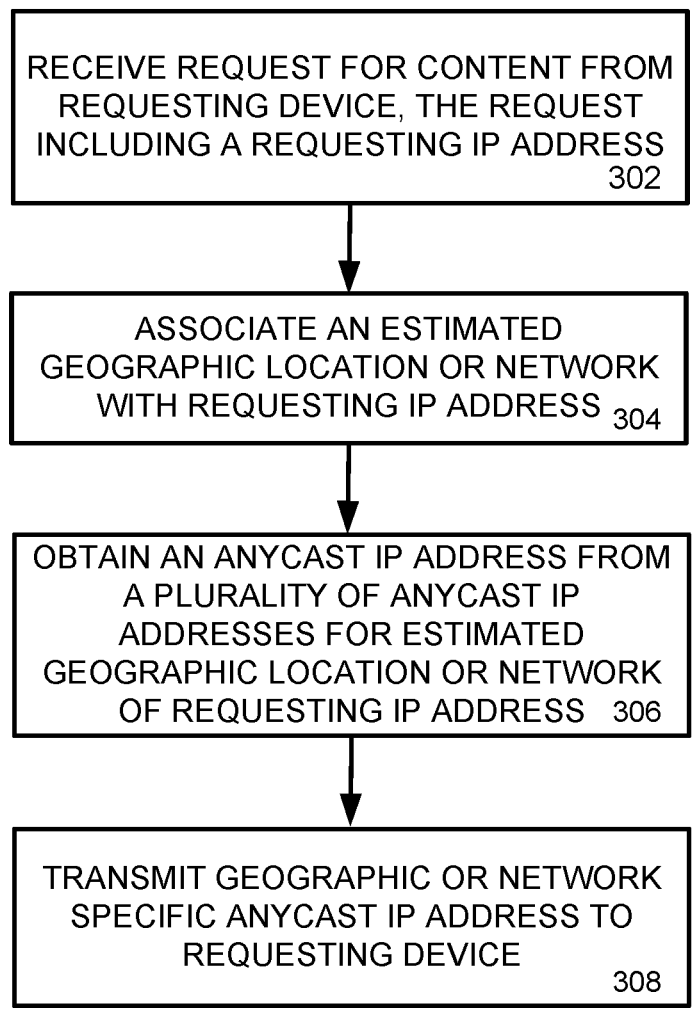
FIG. 3 is a flowchart of a method for a network to utilize multiple anycast addresses to provide content from a network.

FIG. 3 is a flowchart of a method for a network to utilize multiple anycast addresses to provide content from a network. In general, the operations of the method 300 of FIG. 3 are performed by a networking device, such as the Authoritative DNS 208 and/or devices described above in relation to FIG. 2. However, any routing device or resolving device of any telecommunications network may perform the operations of the method 300 to aid a content delivery network in providing content to one or more end user devices.

In operation 302, the networking device receives a request for content from a requesting device. For example and as explained above, the Authoritative DNS 208 receives a request for content from a DNS device of AS-2 204 (such as the Colorado-based DNS 210 device). In one embodiment, the received request may include an IP address associated with the requesting device. The networking device, in operation 304, may associate an estimated geographic location or network identification with the IP address of the requesting device. For example, the networking device may consult or otherwise access a database of estimated geographic locations for known IP addresses. The database may return the estimated geographic location of the IP address associated with the requesting device to the networking device. In another example, the networking device may access a database that associates IP address to one or more customer or access networks. Through this database, the networking device may determine an access network associated with the requesting device.

In operation 306, the networking device may obtain or determine an anycast IP address from a plurality of potential anycast IP address. The selected anycast IP address may be associated with the estimated geographic location or network identification of the requesting device. For example, a request received from an IP address associated with a Colorado location may cause the networking device to select or obtain an anycast IP address associated with the Colorado geographic location. In another example, the anycast IP address may be associated with a particular customer network or access network connected to or otherwise in communication with the content providing network. Once the particular anycast IP address for the received request is obtained, the networking device may transmit or return the selected anycast IP network to the requesting device in operation 308.

In this manner, a content providing network can provide content to requesting devices while utilizing a plurality of anycast IP addresses to direct the requesting device to a local content provider. In general, each of the plurality of anycast IP addresses may be associated with a particular geographic region or an access network in communication with the content providing network. The use of the plurality of anycast IP addresses allows an end user device to be connected to a local content provider, regardless of the location of the connection to the network or location of the requesting device. This approach improves the operation of the content providing network to provide the content to the end user efficiently.

Figure 4:
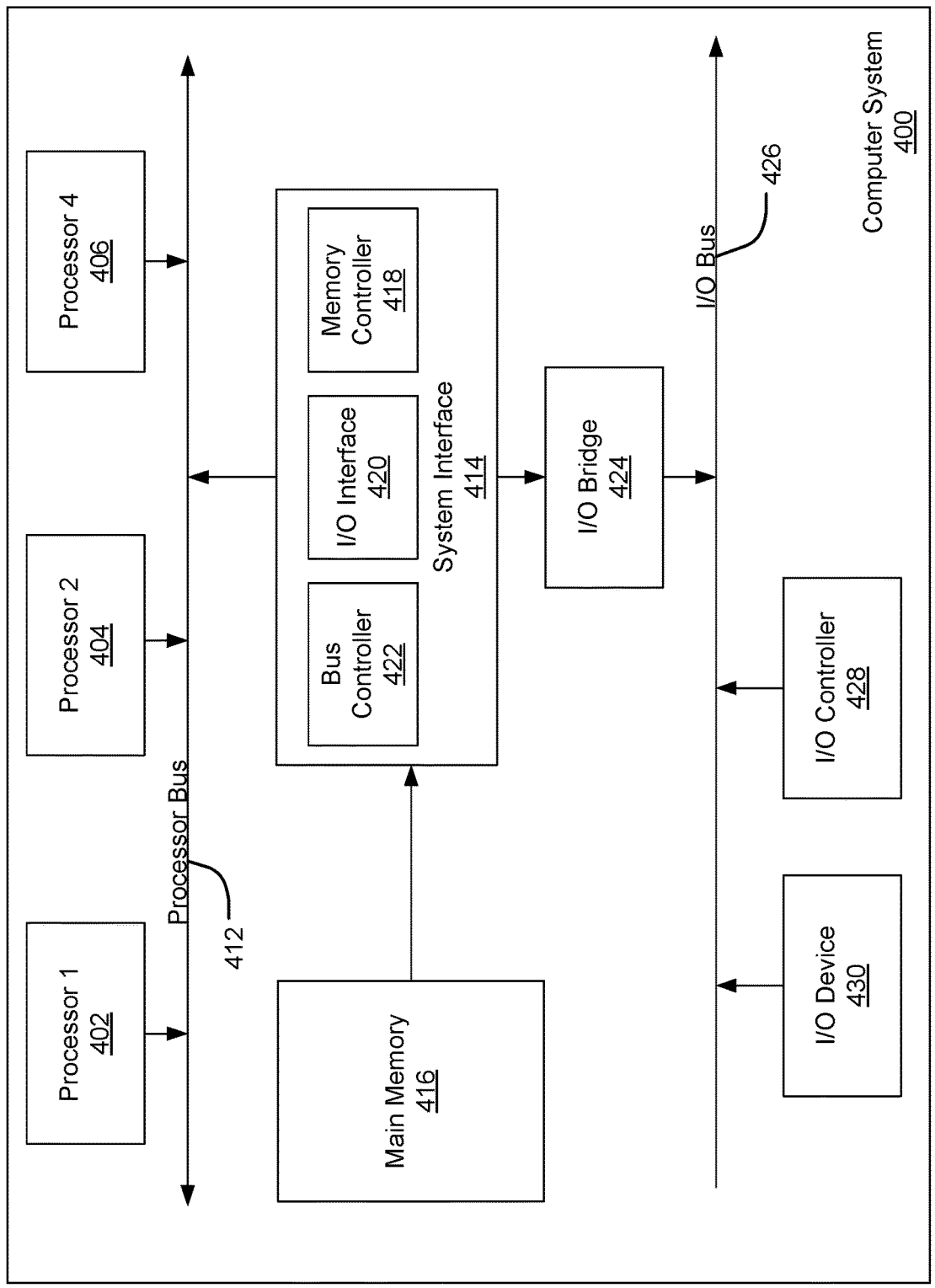
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the network disclosed above. In particular, the computing device of FIG. 4 is one embodiment of the server or other networking component that performs one of more of the operations described above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for servicing requests for content in a content delivery network (CDN), the method comprising:
receiving, from a requesting device, a request for an Internet Protocol (IP) address for a content servicing device in the CDN;
obtaining an approximate geographic location of the requesting device based at least on the request for the IP address;
selecting a geographic-specific anycast IP address based at least on the approximate geographic location of the requesting device, the geographic-specific anycast IP address selected from a plurality of anycast IP addresses utilized in the CDN;
transmitting the geographic-specific anycast IP address to the requesting device, wherein the geographic-specific anycast IP address is associated with a first content servicing device; and
determining that the approximate geographic location of the requesting device is different from a geographic region of an end user device based on the end user device utilizing the geographic-specific anycast IP address.

2. The method of claim 1 further comprising:
analyzing the received request for the IP address of the requesting device; and
obtaining a network identification from the received request, wherein selecting the geographic-specific anycast IP address is further based on the network identification.

3. The method of claim 2 wherein content is provided to the end user device from a content server maintained by a network identified by the network identification.

4. The method of claim 1 wherein the requesting device is a domain name server (DNS) device in communication with the CDN.

5. The method of claim 1 further comprising:
receiving an indication of a high load condition at the first content servicing device; and
transmitting a unicast IP address for a content providing device, wherein the content providing device is located separately from the first content servicing device, wherein the end user device is in communication with the CDN and receives content from the content providing device separate from the first content servicing device based at least on receiving the unicast IP address, the content providing device in a different geographic region as the end user device.

6. The method of claim 1 further comprising:
accessing a database of stored estimated geographic locations of IP addresses to determine the approximate geographic location of the requesting device;
receiving a connection request from the end user device to receive content from the CDN; and
updating the database of stored estimated geographic locations based on receiving the connection request from the end user device.

7. The method of claim 1, wherein the determining is based on the end user device utilizing the geographic-specific anycast IP address to receiving the content from a second content servicing device that is different from the first content servicing device, further comprising:
associating the second content servicing device with a second geographic-specific anycast address;
causing the first content servicing device to broadcast the geographic-specific anycast address;
causing the second content servicing device to broadcast both the geographic-specific anycast address and the second geographic-specific anycast address; and
receiving a connection request from the end user device to receive content from the CDN using the geographic-specific anycast address.

8. A system for servicing requests for content in a content delivery network (CDN), the system comprising:
at least one processor;
memory, operatively connected to the at least one processor and storing instructions that, when executed by the at least one processor, cause the system to perform a method, the method comprising:
receiving, from a requesting device, a request for an Internet Protocol (IP) address for a content servicing device in the CDN;
obtaining an approximate geographic location of the requesting device based at least on the request for the IP address;
selecting a geographic-specific anycast IP address based at least on the approximate geographic location of the requesting device, the geographic-specific anycast IP address selected from a plurality of anycast IP addresses utilized in the CDN;
transmitting the geographic-specific anycast IP address to the requesting device, wherein the geographic-specific anycast IP address is associated with a first content servicing device; and
determining that the approximate geographic location of the requesting device is different from a geographic region of an end user device based on the end user device utilizing the geographic-specific anycast IP address.

9. The system of claim 8, wherein the method further comprises:
analyzing the received request for the IP address of the requesting device; and
obtaining a network identification from the received request, wherein selecting the geographic-specific anycast IP address is further based on the network identification.

10. The system of claim 9, wherein content is provided to the end user device from a content server maintained by a network identified by the network identification.

11. The system of claim 8, wherein the requesting device is a domain name server (DNS) device in communication with the CDN.

12. The system of claim 8, wherein the method further comprises:
receiving an indication of a high load condition at the first content servicing device; and
transmitting a unicast IP address for a content providing device, wherein the content providing device is located separately from the first content servicing device, wherein the end user device is in communication with the CDN and receives content from the content providing device separate from the first content servicing device based at least on receiving the unicast IP address, the content providing device in a different geographic region as the end user device.

13. The system of claim 8, wherein the method further comprises:
accessing a database of stored estimated geographic locations of IP addresses to determine the approximate geographic location of the requesting device;
receiving a connection request from the end user device to receive content from the CDN; and
updating the database of stored estimated geographic locations based on receiving the connection request from the end user device.

14. The system of claim 8, wherein the determining is based on the end user device utilizing the geographic-specific anycast IP address to receiving the content from a second content servicing device that is different from the first content servicing device, the method further comprising:
associating the second content servicing device with a second geographic-specific anycast address;
causing the first content servicing device to broadcast the geographic-specific anycast address;
causing the second content servicing device to broadcast both the geographic-specific anycast address and the second geographic-specific anycast address; and
receiving a connection request from the end user device to receive content from the CDN using the geographic-specific anycast address.

15. A method for servicing requests for content in a content delivery network (CDN), the method comprising:
receiving, from a requesting device, a request for an Internet Protocol (IP) address for a content servicing device in the CDN;
obtaining an approximate geographic location of the requesting device based at least on the request for the IP address;
selecting a first geographic-specific anycast IP address based at least on the approximate geographic location of the requesting device, the geographic-specific anycast IP address selected from a plurality of anycast IP addresses utilized in the CDN;

transmitting the first geographic-specific anycast IP address to the requesting device, wherein the first geographic-specific anycast IP address is associated with a first content servicing device;

causing the first content servicing device to broadcast the first geographic-specific anycast address;

causing a second content servicing device to broadcast both the first geographic-specific anycast address and a second geographic-specific anycast address, wherein the second content servicing device is associated with the second geographic-specific anycast address;

receiving a connection request from an end user device to receive content from the second content servicing device using the first geographic-specific anycast address; and determining that the approximate geographic location of the requesting device is different from a geographic region of the end user device based on the end user device utilizing the first geographic-specific anycast IP address.

16. The method of claim 15, further comprising:

analyzing the received request for the IP address of the requesting device; and obtaining a network identification from the received request, wherein selecting the geographic-specific anycast IP address is further based on the network identification.

17. The method of claim 16, wherein content is provided to the end user device from a content server maintained by a network identified by the network identification.

18. The method of claim 15, wherein the requesting device is a domain name server (DNS) device in communication with the CDN.

19. The method of claim 15 further comprising:

receiving an indication of a high load condition at the first content servicing device; and transmitting a unicast IP address for a content providing device, wherein the content providing device is located separately from the first content servicing device, wherein the end user device is in communication with the CDN and receives content from the content providing device separate from the first content servicing device based at least on receiving the unicast IP address, the content providing device in a different geographic region as the end user device.

20. The method of claim 15 further comprising:

accessing a database of stored estimated geographic locations of IP addresses to determine the approximate geographic location of the requesting device;

receiving a connection request from the end user device to receive content from the CDN; and updating the database of stored estimated geographic locations based on receiving the connection request from the end user device.

* * * * *